(12) United States Patent
Watanabe

(10) Patent No.: US 8,743,252 B2
(45) Date of Patent: Jun. 3, 2014

(54) SOLID-STATE IMAGING DEVICE FOR HIGH DENSITY CMOS IMAGE SENSOR, AND DRIVING METHOD THEREOF

(75) Inventor: Kazufumi Watanabe, Kanagawa (JP)

(73) Assignee: Sony Corporation (JP)

( * ) Notice: Subject to any disclaimer, the term of this patent is extended or adjusted under 35 U.S.C. 154(b) by 313 days.

(21) Appl. No.: 12/720,872

(22) Filed: Mar. 10, 2010

(65) Prior Publication Data

US 2010/0238332 A1 Sep. 23, 2010

(30) Foreign Application Priority Data

Mar. 18, 2009 (JP) ................................. 2009-065391

(51) Int. Cl.
*H04N 3/14* (2006.01)
*H04N 5/335* (2011.01)

(52) U.S. Cl.
USPC .......................................... 348/300; 348/294

(58) Field of Classification Search
CPC ..................................................... H04N 5/378
USPC ......................................................... 348/300
See application file for complete search history.

(56) References Cited

U.S. PATENT DOCUMENTS

| 5,808,677 | A * | 9/1998 | Yonemoto ........................ 348/308 |
| 6,054,704 | A | 4/2000 | Pritchard et al. |
| 6,831,691 | B1 * | 12/2004 | Takada et al. ................... 348/308 |
| 7,542,086 | B2 * | 6/2009 | Hagihara ......................... 348/302 |
| 2001/0033337 | A1 * | 10/2001 | Sakuragi ......................... 348/302 |
| 2002/0126536 | A1 * | 9/2002 | Forbes et al. ................. 365/185.28 |
| 2004/0233310 | A1 * | 11/2004 | Egawa et al. ................... 348/301 |
| 2005/0035273 | A1 * | 2/2005 | Machida et al. ............. 250/214.1 |
| 2008/0007640 | A1 * | 1/2008 | Fuchikami et al. ............ 348/301 |
| 2008/0018766 | A1 | 1/2008 | Miyatake |
| 2009/0001255 | A1 * | 1/2009 | Hong .......................... 250/208.1 |
| 2009/0201400 | A1 * | 8/2009 | Zhang et al. ................... 348/296 |
| 2009/0272879 | A1 * | 11/2009 | Dai ............................. 250/208.1 |

FOREIGN PATENT DOCUMENTS

| JP | S63-76582 | 4/1988 |
| JP | 11-177076 | 7/1999 |
| JP | 2005-065074 | 3/2005 |
| WO | WO 99/30368 | 6/1999 |
| WO | WO 2008/064435 | 6/2008 |

OTHER PUBLICATIONS

European Search Report for European Patent Application No. 10250211.9 dated Mar. 17, 2014, 3 pages.

* cited by examiner

*Primary Examiner* — Roberto Velez
*Assistant Examiner* — Cynthia Segura
(74) *Attorney, Agent, or Firm* — Sheridan Ross P.C.

(57) ABSTRACT

A solid-state imaging device according to an embodiment of the present invention includes plural pixels, in which each pixel includes: a transfer transistor that transfers electric charge from a photoelectric conversion section to a floating diffusion section; a reset transistor that resets the floating diffusion section; a amplifying transistor that outputs a signal based on the electric charge held by the floating diffusion section; a selection transistor that is provided at the output side of the amplifying transistor and selects a pixel; and a charge storage capacitor that is provided between the amplifying transistor and the selection transistor and stores the quantity of electric charge on the basis the quantity of the electric charge held by the floating diffusion section through the charge-discharge behavior of electric charge through a current source.

19 Claims, 11 Drawing Sheets

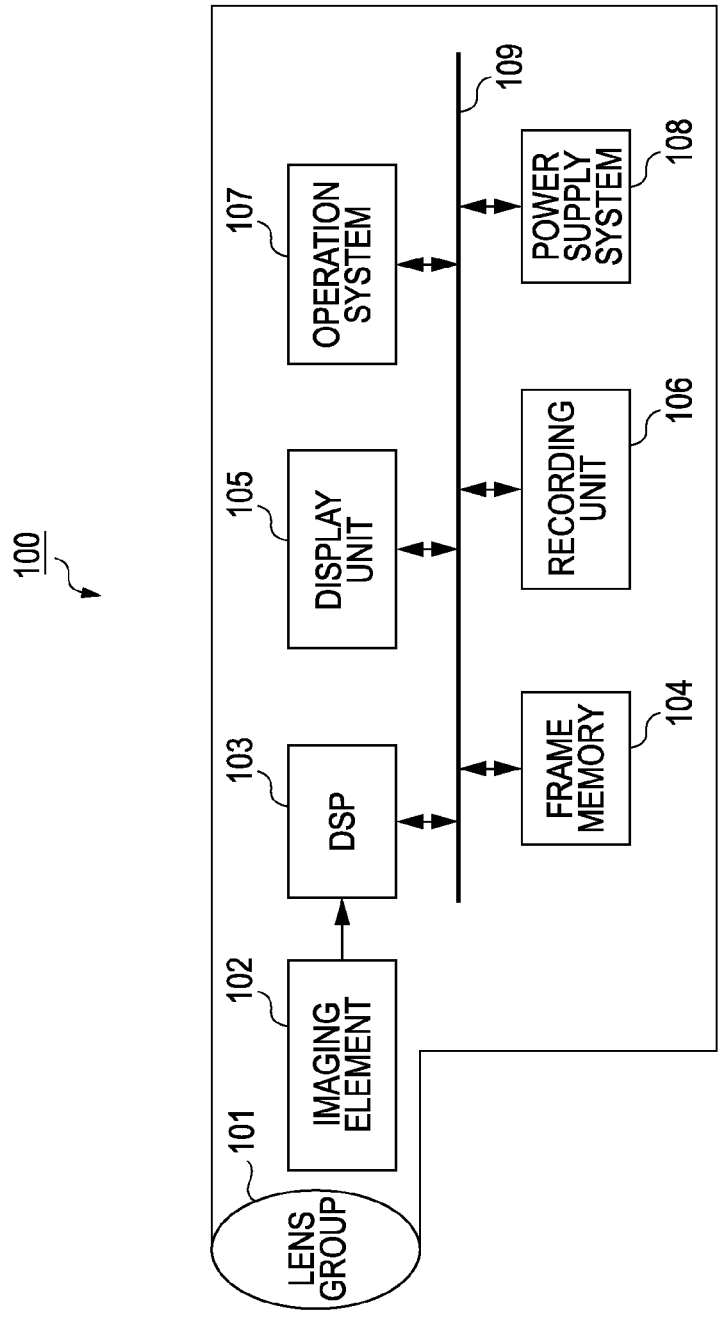

SOLID-STATE IMAGING DEVICE FOR HIGH DENSITY CMOS IMAGE SENSOR, AND DRIVING METHOD THEREOF

BACKGROUND OF THE INVENTION

1. Field of the Invention

The present invention relates to solid-state imaging devices, driving methods thereof, and electronic apparatuses, and more particularly relates to an X-Y address type solid-state imaging device having a global shutter function, a drive method thereof, and an electronic apparatus including the solid-state imaging device.

2. Description of the Related Art

Solid-state imaging devices are broadly categorized into two types, that is, an X-Y address type solid-state imaging device as represented by a CMOS (complementary metal oxide semiconductor) image sensor, and a charge-transfer type solid-state imaging device as represented by a CCD (charge coupled device) image sensor. Compared with the CCD image sensor, the CMOS image sensor has an advantage in that it can randomly access pixel signals, read out the pixel signals at higher speed, and consumes less electric power.

In many CMOS image sensors, electric charge stored in a photoelectric conversion section is transferred to a charge-voltage converter, and a voltage obtained in the charge-voltage converter is output. An electronic shutter function is realized by periodically resetting the charge-voltage converter. The shutter scheme employed by the electronic shutter function of the CMOS image sensor is a so-called rolling shutter scheme (also called a focal-plane shutter scheme) where the start and end of exposure is set for all the pixels belonging to each pixel row among a plurality of pixels arranged in a two-dimensional array on a pixel row-by-pixel row basis.

Therefore, different from the CCD image sensor that employs a global shutter scheme where exposure of all the pixels is performed at the same time, pixels in the CMOS image sensor that employs the rolling shutter scheme have (different) time slots of exposure shifted from each other if the pixels belong to different pixel rows. In addition, because the time slots of exposure assigned to the pixel rows are different from each other, a captured image is distorted when a moving object is captured by the CMOS image sensor.

In the related art, in order to realize a global shutter function, a configuration, where a charge storage capacitor is connected in parallel with a floating diffusion unit that converts charge into a signal voltage, is adopted in a pixel so that the charge storage capacitor stores the charge (see, for example, Japanese Unexamined Patent Application Publication No. 11-177076).

In addition, in order to realize the global shutter function and to amplify a signal voltage in a pixel, a configuration, where two charge storage capacitors are provided per pixel and a ratio between the values of these two capacitors is used for the amplification of the signal, is employed (see, for example, Japanese Unexamined Patent Application Publication No. 2005-65074).

SUMMARY OF THE INVENTION

In the example of the related art described in Japanese Unexamined Patent Application Publication No. 11-177076, it is necessary to set the capacitance value of the charge storage capacitor to be large in order to increase the charge retention time and improve the resistance to noise. However, if the capacitance value of the charge storage capacitors is set to be large, the capacitance of the floating diffusion section becomes large, which results in the decrease of the charge-voltage conversion efficiency. In other words, there is a trade-off relation between the charge retention time of the charge storage capacitor and the charge-voltage conversion efficiency of the floating diffusion section.

In addition, it is necessary that the charge storage capacitor described in the above patent application publication holds the whole quantity of the charge transferred from the photoelectric conversion section. Therefore, the area of the charge storage capacitor becomes nearly as large as that of the photoelectric conversion section, with the result that the related art disclosed in Japanese Unexamined Patent Application Publication No. 11-177076 is not suitable for the miniaturization of a pixel. In addition, it is necessary that, because the logarithmic signal compression technique and the signal amplification technique using a current mirror circuit is employed in the configuration of the pixel used in the related art described in the above patent application publication, the size of an amplifying transistor becomes large in order to suppress the variation of the threshold voltage Vth of the amplifying transistor and to increase the gain of the amplifying transistor, with the result that the related art is not suitable for the miniaturization of the pixel. In addition, in the related art, because a kTC noise generated in the reset state of the pixel is not eliminated, a fixed pattern noise peculiar to the pixel is not suppressed.

On the other hand, in another related art disclosed in Japanese Unexamined Patent Application Publication No. 2005-65074, because two transistors are used to reset the above-mentioned two charge storage capacitors and the number of elements to be integrated in a pixel becomes large, the high-density integration of a CMOS image sensor becomes difficult. In addition, because two systems of reset signals used to reset pixels are necessary, the configuration of peripheral circuits for driving the pixels becomes complicated.

The present invention is achieved with the above-described problems borne in mind, and provides a solid-state imaging device that is integrated in the high density without decreasing the charge-voltage conversion efficiency, a drive method thereof, and an electronic apparatus including the solid-state imaging device.

A solid-state imaging device according to an embodiment of the present invention includes plural pixels, in which each pixel includes: a transfer transistor that transfers electric charge from a photoelectric conversion section to a FD (floating diffusion) section; a reset transistor that resets the floating diffusion section; a amplifying transistor that outputs a signal based on the electric charge held by the floating diffusion section; a selection transistor that is provided at the output side of the amplifying transistor and selects a pixel; and a charge storage capacitor that is provided between the amplifying transistor and the selection transistor and stores the quantity of electric charge on the basis of the quantity of the electric charge held by the FD section through the charge-discharge behavior of electric charge through a current source.

In the above configuration of the solid-state imaging device, because the charge storage capacitor used to realize a global shutter function is provided between the amplifying transistor and the selection transistor, and the charge storage capacitor is not connected in parallel with the capacitor of the FD section, with the result that providing the charge storage capacitor does not cause the capacitance value of the FD section to largely increase. Therefore, the charge retention time of the charge storage capacitor and the charge-voltage conversion efficiency of the FD section that may have a trade-off relation with each other can be both satisfied. To put it concretely, the charge retention time of the charge storage capacitor can be increased and the resistance to noise can be improved without decreasing the charge-voltage conversion efficiency of the FD section by setting the capacitance value of the charge storage capacitor large. As a result, adding only one charge storage capacitor to each pixel can realize a global shutter function.

According to the embodiment of the present invention, because the charge retention time of the charge storage capacitor and the charge-voltage conversion efficiency of the FD section that may have a trade-off relation with each other can be both satisfied and at the same time the global shutter function can be realized with a small number of elements, the solid-state imaging device can be integrated in the high density without decreasing the charge-voltage conversion efficiency of the FD section.

BRIEF DESCRIPTION OF THE DRAWINGS

FIG. 11 is a block diagram showing an example of a schematic configuration of an imaging apparatus according to an embodiment of the present invention.

DESCRIPTION OF THE PREFERRED EMBODIMENT

Embodiments according to the present invention will be described in detail hereinafter with reference to the drawings. The description will be made about the following subjects in this order.

1. A solid-state imaging device according to an embodiment of the present invention (an example of a CMOS image sensor)

2. A first embodiment of the present invention (an example of a pixel with no common components)

3. A second embodiment of the present invention (an example of a pixel with common components)

4. A charge storage capacitor (an example of a stacked capacitor)

5. Modifications

6. An electronic apparatus according to an embodiment of the present invention (an example of an imaging apparatus)

1. A Solid-State Imaging Device According to an Embodiment of the Present Invention (System Configuration)

Figure 1:
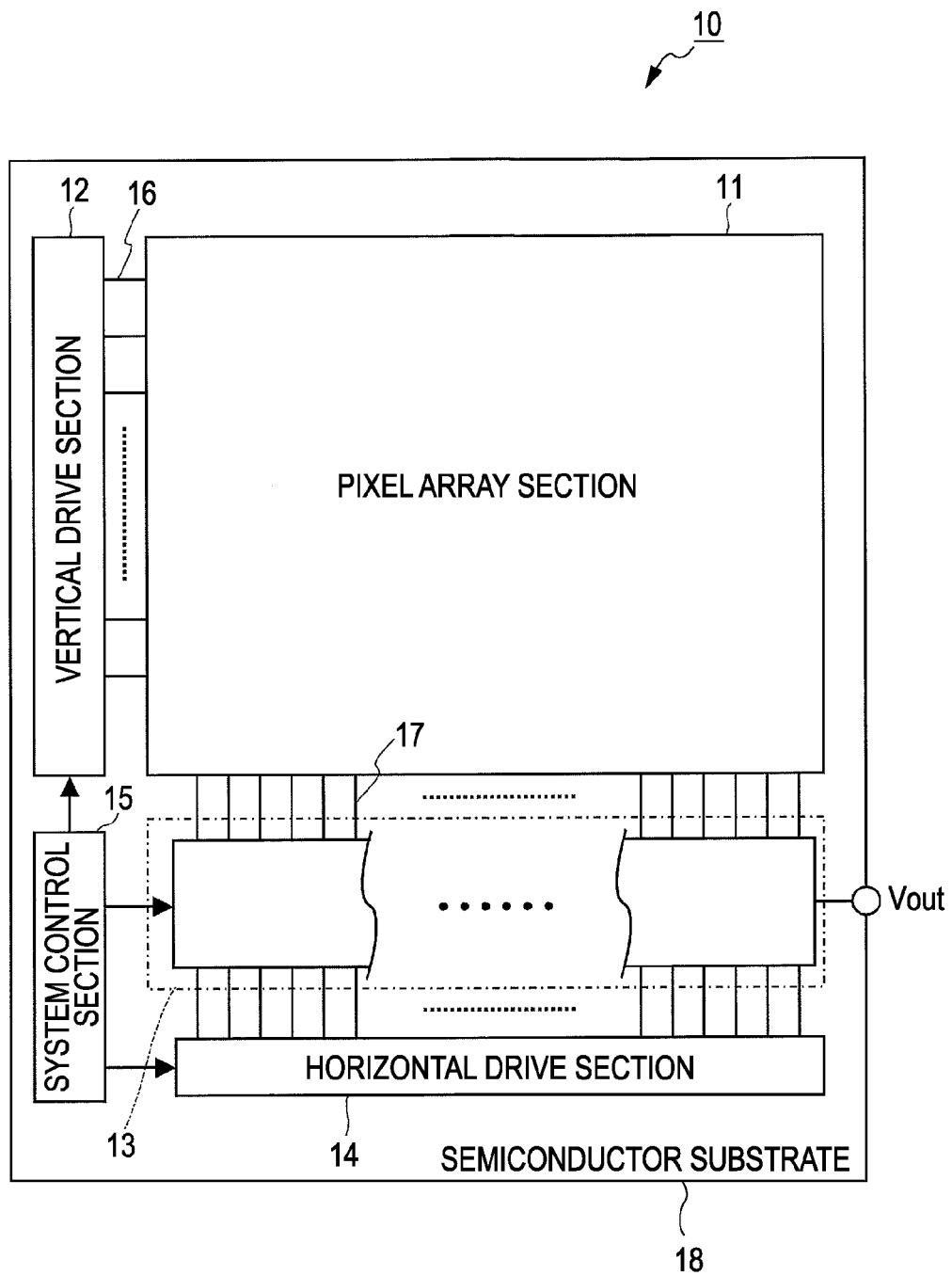
FIG. 1 is a system diagram showing a schematic configuration of a CMOS image sensor according to an embodiment of the present invention.

FIG. 1 is a system diagram showing a schematic configuration of, for example, a CMOS image sensor, which is a type of an X-Y address type solid-state imaging device, according to an embodiment of the present invention. The CMOS image sensor is a generic name given to an image sensor which or part of which is manufactured using a CMOS processing technique.

As shown in FIG. 1, the CMOS image sensor 10 includes a pixel array section 11 formed on a semiconductor substrate (chip) 18, and other peripheral circuits integrated on the same semiconductor substrate 18. The peripheral circuits are, for example, a vertical driving section 12, a column processing section 13, a horizontal driving section 14, and system control section 15.

In the pixel array section, plural pixels (not shown), each of which includes a photoelectric conversion section (for example, a photodiode) that converts visible incident light into a quantity of electric charge based on the quantity of visible incident light, are arranged in a two-dimensional array. A pixel may be sometimes merely called a pixel hereinafter. Each pixel includes a so-called micro lens, that is, a lens used for focusing incident light, and a color filter if the pixel is compliant with color imaging (the micro lens and the color filter are not shown). The concrete configuration of the pixel will be described later.

In the pixel array section 11, the pixels are arranged in a matrix and a pixel driving line 16 is formed for pixels of each pixel row of the pixel array horizontally along the row direction, and a vertical signal line 17 is formed for pixels of each pixel column of the pixel array vertically along the column direction.

In FIG. 1, each pixel driving line 16 is represented by one solid line, but it is not necessarily one signal line, but it is typically composed of plural signal lines as described later. One end of each of the pixel driving lines 16 is connected to the output terminal of the vertical driving section 12 corresponding to a respective row of the pixel array section.

The vertical driving section 12 is composed of shift registers, address decoders, and the like. The vertical driving section 12 includes a readout scanning system and a sweep scanning system (the concrete configuration of the vertical driving section 12 is not shown). The readout scanning system performs selective scanning for selecting in sequence all the pixels belonging to each row of the pixel array on a row-by-row basis.

On the other hand, the sweep scanning system sweeps (resets) unnecessary charge out of photoelectric conversion elements of the pixels belonging to a row that will be selected by the readout scanning system. In this case, the sweep scanning precedes the readout scanning by the shutter speed time of the CMOS image sensor. The sweep scanning system starts a so-called electronic shutter operation by sweeping out (resetting) the unnecessary charge. In the electronic shutter operation, the photoelectric charge of the photoelectric conversion elements is swept out and a new exposure starts (photoelectric charge is newly stored).

A signal read out by the readout scanning system corresponds to the quantity of incident light that enters after the immediately preceding readout operation or the immediately preceding electronic shutter operation. The period from the readout timing of the immediately preceding readout operation or the sweep timing of the immediately preceding electronic shutter operation to the readout timing of the latest readout operation is the storage time of photoelectric charge (exposure time).

A pixel signal output from each pixel belonging to the pixel row selected and read out by the vertical driving section 12 is fed to the column processing section 13 through the vertical signal line 17 corresponding to the pixel. The column processing section 13 performs predefined signal processing on the analog pixel signal output from each pixel 20 belonging to the selected row, where the predetermined signal processing is performed on a pixel column-by-pixel column basis (on the basis of pixel columns of the pixel array section 11).

An example of the signal processing performed by the column processing section 13 is CDS (correlated double sampling) processing. After obtaining a reset level and a signal level output from each pixel belonging to the selected pixel row, the CDS processing calculates the difference between the two levels to obtain pixel signals corresponding to the selected pixel row and to eliminate fixed pattern noises peculiar to the pixels as well. For a CDS circuit, either of an analog type circuit or a digital type circuit can be employed.

There is a case where the column processing section 13 includes an A/D conversion function. For an A/D conversion circuit, any of a successive approximation type circuit, a flush type circuit, a pipeline type circuit, and a delta-sigma type circuit can be employed.

The horizontal driving section 14 is composed of shift registers, address decoders, and the like, and performs selective scanning in sequence of the circuits of the column processing section 13 corresponding to the pixel columns. Through the selective scanning performed by the horizontal driving section 14, pixel signals that have been signal-processed by the column processing section 13 are output in sequence on a pixel column-by-pixel column basis.

The system control section 15 receives clocks, data indicating operation modes, and the like given from the outside of the semiconductor substrate 18, and sends data including internal information about the CMOS image sensor and the like. In addition, the system control section 15 includes a timing generator that generates various timing signals, and controls the vertical driving section 12, the column processing section 13, the horizontal driving section 14, and the like with the use of the various timing signals.

A global shutter function that exposes all the pixels 20 of the CMOS image sensor 10 at the same timing can be realized by adding a charge storage capacitor that temporarily stores electric charge to each pixel 20. Here, exposing all the pixels at the same timing means starting the exposure of all the pixels simultaneously and ending the exposure of all the pixels simultaneously. Concrete embodiments of a pixel 20 will be described hereinafter from the viewpoint of adding charge storage capacitor to the pixel 20 in order to realize the global shutter function.

2. A First Embodiment of the Present Invention

[Circuit Configuration]

Figure 2:
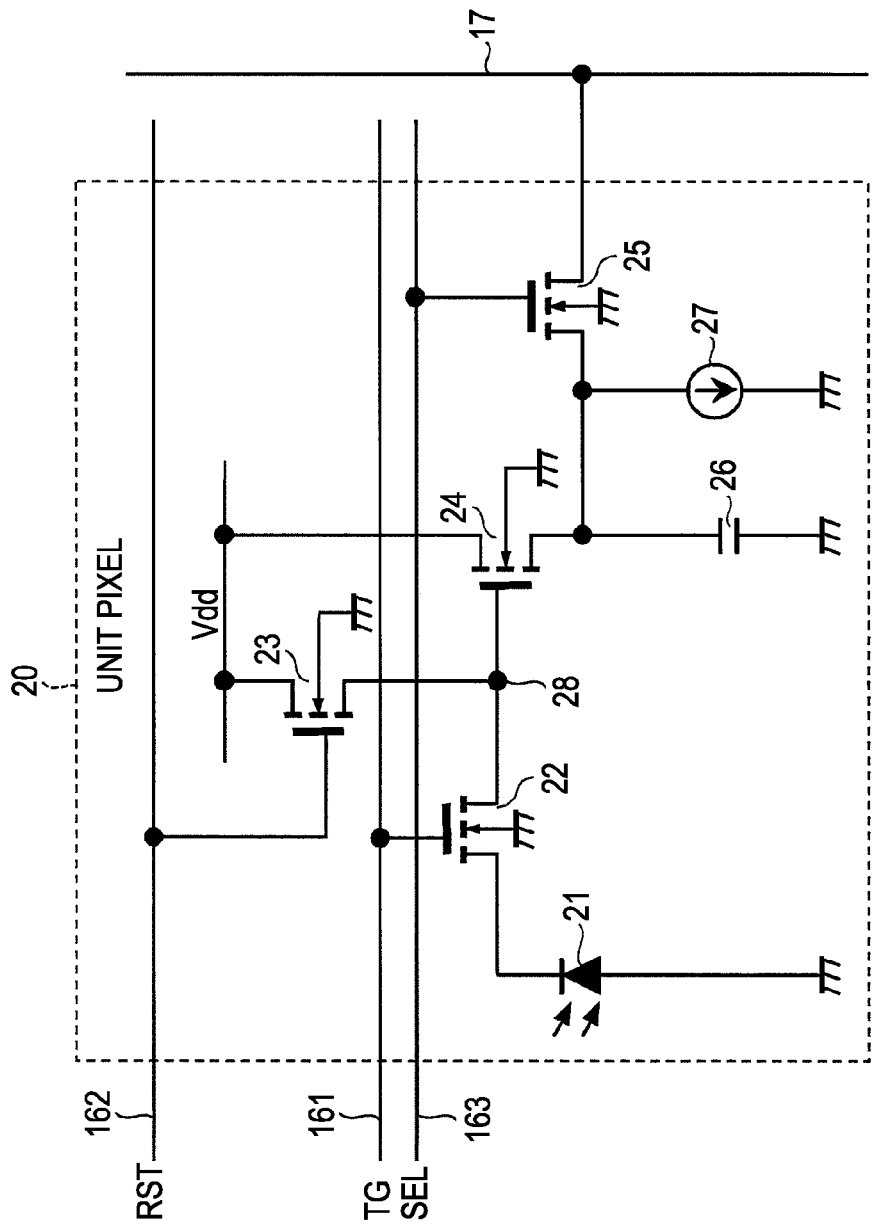
FIG. 2 is a circuit diagram showing a circuit configuration of a pixel according to a first embodiment of the present invention.

FIG. 2 is a circuit diagram showing a circuit configuration of a pixel 20 according to a first embodiment of the present invention. As shown in FIG. 2, the pixel 20 according to the first embodiment includes, for example, four transistors 22 to 25, one capacitor 26, and one current source 27 as well as a photodiode 21 that is a photoelectric conversion section, where the capacitor 26 is used as a charge storage capacitor to realize a global shutter function.

Here, it will be assumed that the four transistors 22 to 25 are N-channel MOS transistors. However, this conductivity type combination of the transistors 22 to 25 is only an explanatory example, and it goes without saying that this part of the pixel 20 is not limited to this combination.

In this pixel 20, a pixel driving line 16 is composed of, for example, a transfer line 161, a reset line 162, and a selection line 163, and these three lines are connected in common to all the pixels belonging to the same pixel row. Ends of the transfer line 161, the rest line 162, and the selection line 163 corresponding to a certain pixel row are individually connected to output terminals corresponding to the transfer line 161, the reset line 162, and the selection line 163 of the certain pixel row of the vertical driving section 12.

The transistor 22 will be called the transfer transistor, the transistor 23 will be called the reset transistor, the transistor 24 will be called the amplifying transistor, and the transistor 25 will be called the selection transistor hereinafter.

The photodiode 21 with its anode connected to ground converts received light into a quantity of photoelectric charge (photoelectrons) based on the quantity of the received light, and stores the photoelectric charge. The cathode electrode of the photodiode 21 is connected to one of the main electrodes (the drain electrode or the source electrode) of a transfer transistor 22 that works as a transfer gate.

The other of the main electrodes (the source electrode or the drain electrode) of the transfer transistor 22 is connected to the gate electrode of the amplifying transistor 24. The node 28 to which both the other of the main electrodes of the transfer transistor 22 and the gate electrode of the amplifying transistor 24 are connected is called an FD (floating diffusion) section. In other words, the transfer transistor 22 is located between the cathode electrode of the photodiode 21 and the FD section 28.

A transfer signal TG with a high level is applied to the gate electrode of the transfer transistor 22, where a high level, for example, a Vdd level, is an active level for the transfer signal TG (Vdd is a positive power supply voltage). A signal with a high level, which is an active level for the signal, will be called a High active signal hereinafter. As a result, the transfer transistor 22 is turned on, photoelectric conversion is performed in the photodiode 21, and photoelectric charge created by the photodiode 21 is transferred to the FD section 28.

The drain electrode of the reset transistor 23 is connected to the positive power supply voltage Vdd, and the source electrode of the reset transistor is connected to the FD section 28. A High active reset signal FRST is applied to the gate electrode of the reset transistor 23 through the reset line 162 if necessary. The reset transistor 23 is turned on by the High active reset signal FRST, which causes the electric charge stored in the FD section 28 to be absorbed into the positive power supply voltage Vdd so that the FD section 28 is reset.

The gate electrode of the amplifying transistor 24 is connected to the FD section 28, and the drain electrode of the amplifying transistor 24 is connected to the positive power supply voltage Vdd. For example, the drain electrode of the selection transistor 25 is connected to one of the terminals of the charge storage capacitor 26, which is connected to the source electrode of the amplifying transistor 24, and the source electrode of the selection transistor 25 is connected to the vertical signal line 17.

When a High active selection signal SEL is applied to the gate electrode of the selection transistor 25 through the selection line 163, the selection transistor 25 turns on, which in turn causes the amplifying transistor 24 to be turned on. In other words, the selection transistor 25 causes the pixel 20 to be selected, and relays a signal output from the amplifying transistor 24 to the vertical signal line 17.

The charge storage capacitor (GC) 26 is provided to realize a global shutter function, and is disposed between the source electrode of the amplifying transistor 24 and a reference voltage node (for example, ground). The charge storage capacitor 26 stores electric charge on the basis of the electric charge held by the FD section.

It is necessary for the charge storage capacitor 26 to have a capacitance value larger than that of the wiring capacitance (parasitic capacitance etc.) of the vertical signal line 17 used for outputting the signal. The charge storage capacitor 26 will be described in detail later.

The current source (IGC) 27 is disposed between the source electrode of the amplifying transistor 24 and ground in the same manner as the charge storage capacitor 26. In other words, the current source 27 is connected to the charge storage capacitor 26 in parallel. In the above description, the current source 27 is shown as one of the components of the pixel 20 for the purpose of illustration, but it is not necessary that the current source 27 be installed on a current source-by-pixel basis to build the pixel 20. In other words, a configuration that provides one current source 27 for all the pixels belonging to one pixel row as a common component, or another configuration that provides one current source 27 for all the pixels of the pixel array section 11 as a common component can be employed.

Compared with the configuration that provides a current source 27 on a current source-by-pixel basis, the configuration that provides one current source for all the pixels belonging to one pixel row or for all the pixels of the pixel array section as a common component can reduce the number of components per pixel, which is a considerable advantage in the miniaturization of the pixel. In addition, in the configuration that provides a current source on a current source-by-pixel basis, it is necessary to provide one drive line per pixel row in order to control the current sources 27. However, in the configuration that provides one current source 27 for all the pixels belonging to one pixel row or for all the pixels of the pixel array section as a common component, the number of drive lines can be significantly reduced.

Figure 3A:
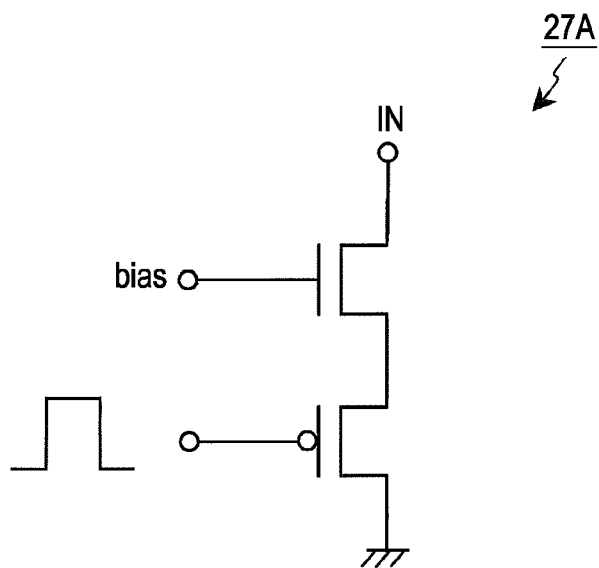
FIG. 3 is a circuit diagram showing a concrete example of a circuit configuration of a current source.
Figure 3B:
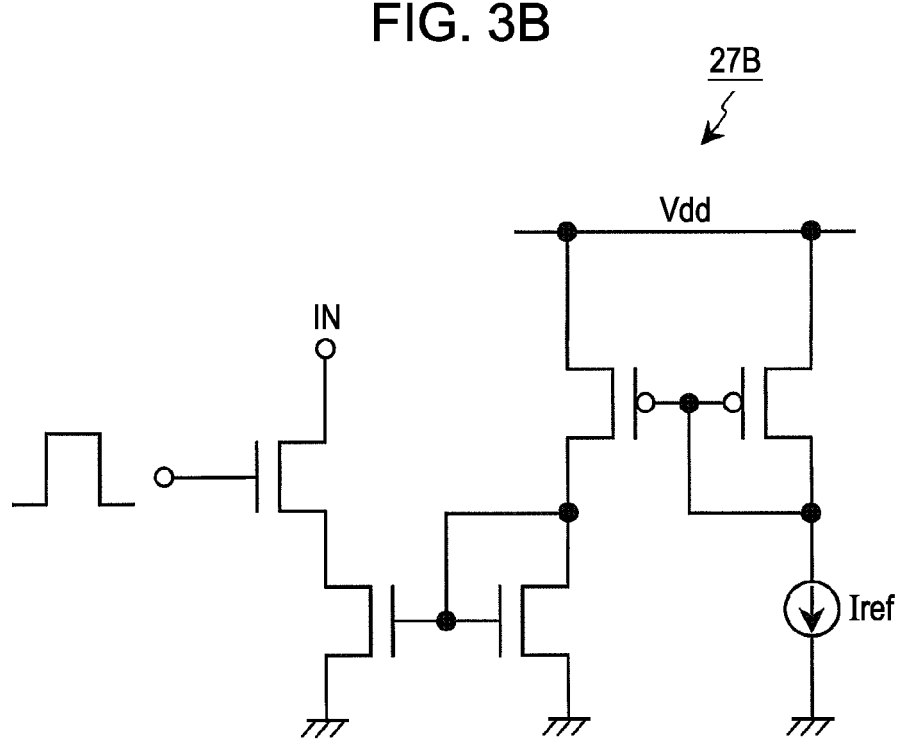

A current source 27A including a source-grounded MOSFET (field effect transistor) circuit as shown in FIG. 3A, or a current source 27B including a current mirror circuit as shown in FIG. 3B can be adopted as the current source 27. In FIG. 3A, "bias" represents a gate bias voltage for driving a MOSFET other than the source-grounded MOSFET. In FIG. 3B, "Iref" represents a current source for driving the current mirror circuit, and "Vdd" represents a positive power supply voltage. Both current sources 27A and 27B turn on in response to pulse signals as shown in FIG. 3A and FIG. 3B.

[Circuit Behavior]

The CMOS image sensor 10 including the above-described pixels 20 disposed two-dimensionally in a matrix has an electronic shutter function that is driven by the vertical driving section 12, and more particularly a global shutter function.

This global shutter function is performed by reading out electric charge from the photodiodes 21 of all the pixels of the pixel array section 11 simultaneously after the FD sections 28 of all the pixels have been simultaneously reset by the reset transistor s23. Here, reading out electric charge means reading out the electric charge from the photodiode 21 and holding the read-out electric charge in the FD sections 28 or the charge storage capacitors 26.

Figure 4:
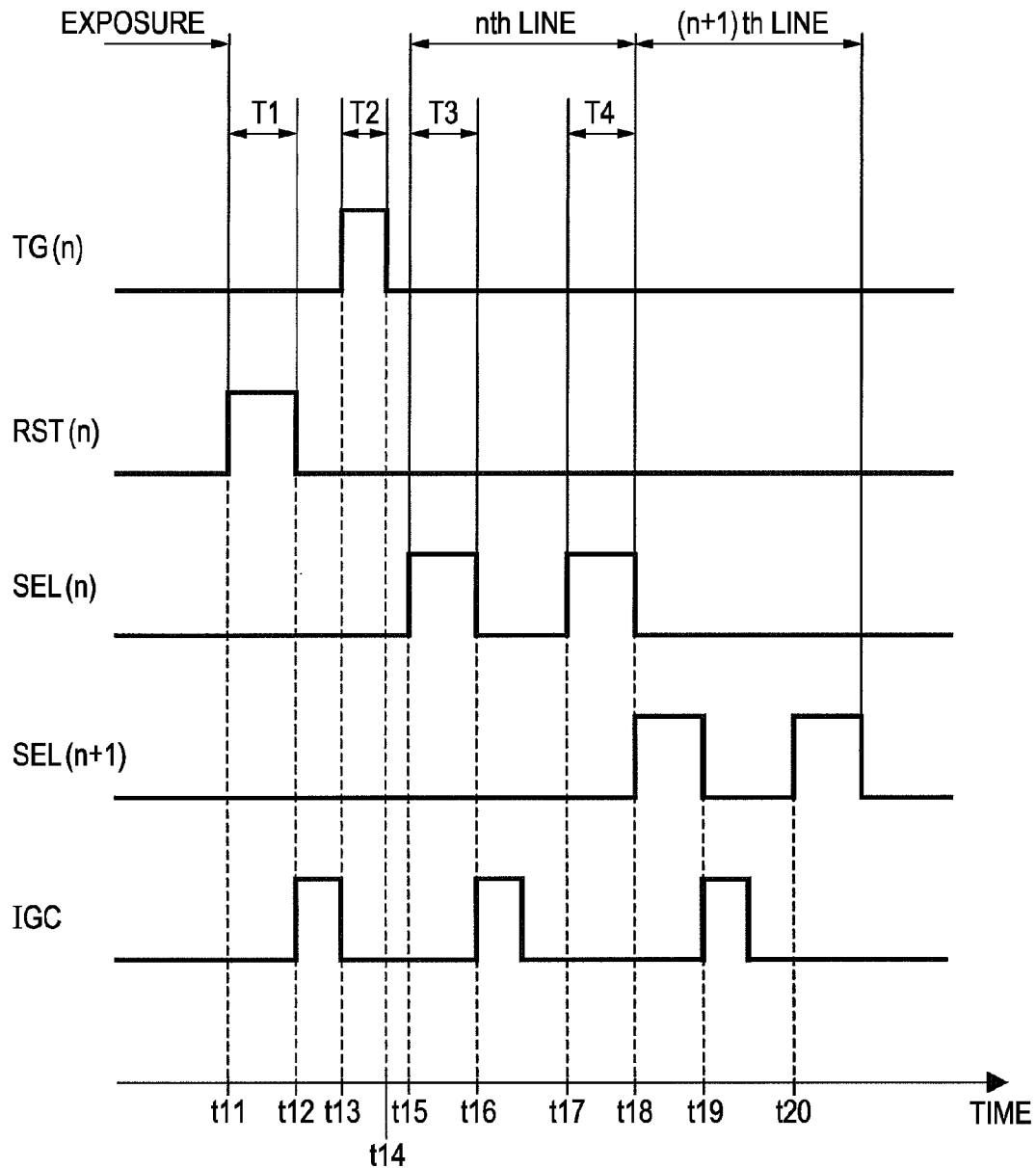
FIG. 4 is a timing chart used for explaining the circuit behavior of the pixel according to the first embodiment of the present invention.
Figure 5A:
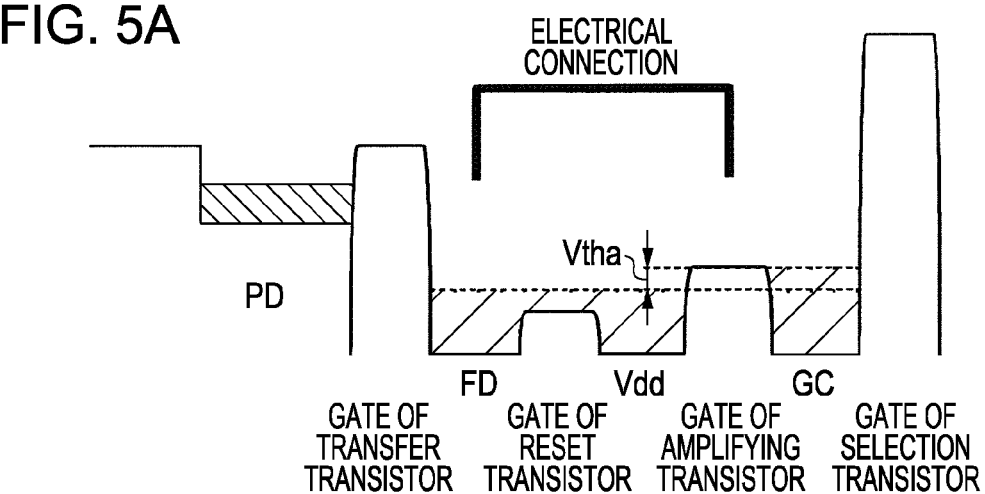
FIG. 5A, FIG. 5B, and FIG. 5c are explanatory drawings used for explaining the circuit behavior of the pixel according to the first embodiment of the present invention.
Figure 5B:
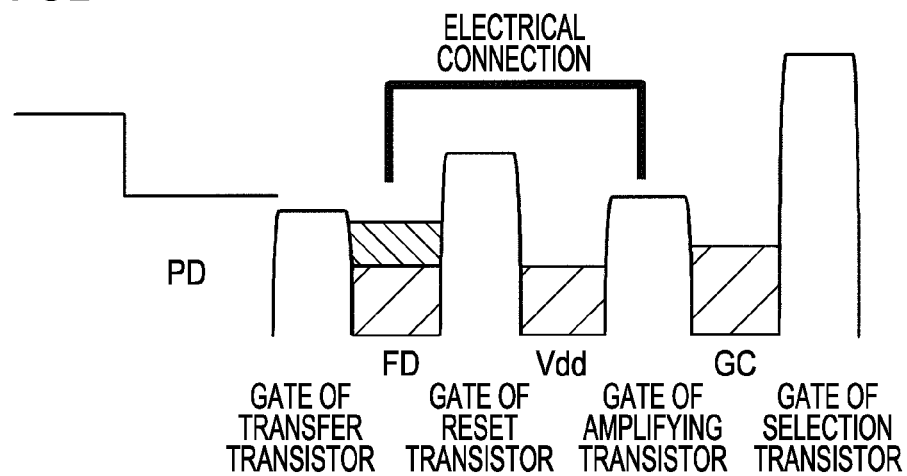
Figure 5C:
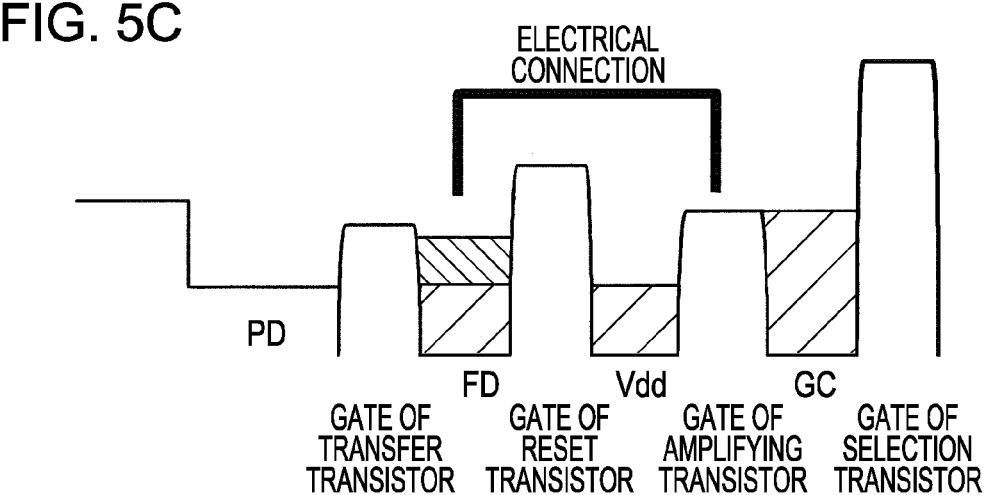

The circuit behavior of the pixel 20 configured as described above will be described in detail with reference to a timing chart in FIG. 4 and explanatory drawings in FIG. 5A, FIG. 5B, and FIG. 5C. FIG. 4 is the timing chart showing the relation among a transfer signal TG(n), a reset signal RST(n), and a selection signal SEL(n) for the nth row of the pixel array section and a selection signal SEL(n+1) for the (n+1)th row.

In the following description of the circuit behavior, a high level that is higher than the threshold voltage Vth of the MOSFET, that is, the voltage level that makes the MOSFET on, is called a High level ("H" level for short) and a low level that is lower than the threshold voltage Vth of the MOSFET, that is, the voltage level that makes the MOSFET off, is called a Low level ("L" level for short). "H" level is, for example, the positive power supply voltage Vdd, and "L" level is, for example, 0 V.

At the time t11 when exposure finishes, the reset signal RST(n) transfers from "L" level to "H" level, which causes the reset transistor 23 to be on, so that the FD section 28 is reset. In other words, because the electric charge stored in the FD section is absorbed into the positive power supply voltage Vdd through the reset transistor 23, the FD section 28 is reset. The potential of the FD section 28 is changed by the reset of the FD section 28, which causes the voltage of the gate electrode (gate voltage) of the amplifying transistor 24 to be changed because the gate electrode is connected to the FD section 28.

Following the change of the gate voltage of the amplifying transistor 24, the electric charge stored in the charge storage capacitor 26 flows out through the current source (IGC) 27. In the initial state, the charge storage capacitor 26 is filled with electric charge, and the quantity of electric charge that flows out through the current source 27 is determined by the gate voltage of the amplifying transistor 24. In other words, the quantity of charge stored in the charge storage capacitor 26 after the reset of the FD section 28 is determined by the potential of the FD section 28 after the reset of the FD section 28 as shown in FIG. 5A.

When the reset signal RST(n) transfers from "H" level to "L" level at the time t12, the reset behavior of the FD section 28 finishes. In other words, the reset period of the FD section 28 is the period T1 during which the reset signal RST(n) holds "H" level. During this reset period, because a kTC noise is generated at the FD section 28, the potential of the FD section 28 randomly fluctuates. Here, the kTC noise is a reset noise generated owing to the switching behavior of the reset transistor 23 that has an effect on the FD section 28.

To compensate the random fluctuation of the potential of the FD section, the current source 27 becomes active (turns on) by detecting the down edge of the reset signal RST(n) (at the time t12). During the period from t12 to t13 when the current source 27 is on, the fluctuation of the potential of the FD section is compensated.

After the reset of the FD section 28, the potential of the FD section 28 has an effect on the charge storage capacitor 26, and the charge storage capacitor 26 stores electric charge based on the potential of the FD section 28. Because the charge stored in the charge storage capacitor 26 at the time of the reset of the FD section 28 remains unchanged until the voltage between the terminals of the charge storage capacitor 26 based on the quantity of the charge stored in the charge storage capacitor 26 is read out as a reset voltage, it is not necessary to reset the FD section 28 just before the charge transfer from the photodiode 21. Therefore, the overflowing charge from the photodiode 21 that occurs at the time of overexposure can be stored in the FD section 28, which expands the dynamic range for incident light.

Next, when the transfer signal TG(n) transfers from "L" level to "H" level at the time t13, the transfer transistor 22 turns on and begins to transfer the photoelectric charge stored in the photodiode 21 to the FD section 29. When the transfer signal TG(n) transfers from "H" level to "L" level at the time t14, the transfer of the charge from the photodiode to the FD section 28 finishes.

In other words, the charge transfer period from the photodiode 21 to the FD section 28 is the period T2 during which the transfer signal TG(n) holds "H" level. After this charge transfer period T2, the gate voltage of the amplifying transistor 24 fluctuates in accordance with the fluctuation of the potential of the FD section 28. Because the current source 27 is off when the charge transfer finishes, the current source 27 does not feed charge to the charge storage capacitor 26.

Therefore, if the gate voltage of the amplifying transistor 24 fluctuates, the voltage between the terminals of the charge storage capacitor 26 does not fluctuate. In other words, after the charge transfer from the photodiode 21 to the FD section 28, the charge storage capacitor 26 holds the same quantity of charge as it has after the reset of the FD section 28 as shown in FIG. 5B.

Next, when the selection signal SEL(n) transfers from "L" level to "H" level at the time t15, the selection transistor 25 turns on and outputs the voltage between the terminals of the charge storage capacitor 26 to the vertical signal line 17 as a reset signal. In other words, the period T3 during which the selection signal SEL(n) holds "H" level is the reset voltage readout period. Then, at the time t16 when the selection signal SEL(n) transfers from "H" level to "L" level and the readout period T3 finishes, the current source 27 turns on again.

At this time, the gate voltage of the amplifying transistor 24 has been fixed to the potential of the FD section 28 just after the end of the charge transfer from the photodiode 21 to the FD section 28. Therefore, owing to the current source 27 turning on, the electric charge stored in the charge storage capacitor 26 is determined by the potential of the FD section 28 just after the end of the charge transfer from the photodiode 21 to the FD section 28 as shown in FIG. 5C.

Then, when the selection signal SEL(n) transfer from "L" level to "H" level again at the time t17, the selection transistor 25 turns on again and outputs the voltage between the terminals of the charge storage capacitor 26 to the vertical signal line 17 as a signal voltage. In other words, the period T4 during which the selection signal SEL(n) again holds "H" level is the signal voltage readout period. The signal voltage at this time corresponds to the quantity of the photoelectric charge transferred (read out) from the photodiode 21 to the FD section 28. In addition, the electric charge that has been stored in the charge storage capacity 26 is completely discharged because it is swept away to the vertical signal line 17 through the selection transistor 25.

As described above, a series of behaviors for reading out the reset voltage and the signal voltage for each pixel 20 of the nth pixel row finishes. Then a series of behaviors for reading out the reset voltage and the signal voltage for each pixel 20 of the nth pixel row during the period including the time t18, t19, and t20 is also performed as it is performed during the period including the time t15, t16, and t17.

To put it shortly, the quantity of electric charge based on the quantity of electric charge QFD stored in the FD section 28 at the time of the reset of the FD section 28 is held in the charge storage capacitor 26, and the electric charge generated in the photodiode 21 by the exposure is held in the FD section 28.

Then, under the condition that the reset charge is held in the charge storage capacitor 26, and the signal charge is held in the FD section 28, a series of processes of reading out the reset voltage and the signal voltage for each pixel 20 after the time t15 as shown in FIG. 4 is executed by shifting the start time for each pixel row or for each pixel column.

The reset voltage read out during the period T3 and the signal voltage read out during the period T4 are fed in sequence to the column processing section 13 shown in FIG. 1 through the vertical signal line 17. Then correlated double sampling (CDS) processing is performed on the signal voltage at the column processing section 13 to eliminate a fixed pattern noise peculiar to each pixel and an adverse effect owing to the variation of the Vth of each transistor. After the noise elimination, the signal voltage is converted by, for example, an A/D converter embedded in the column processing section 13 into a digital signal and the digital signal is output.

If the capacitance value of the FD section 28 is represented by CFD, the quantity of charge stored in the FD section 28 by QFD, the potential of the FD section 28 by VFD, the relation among CFD, QFD, and VFD is $QFD = CFD \times VFD.$ In a similar way, if the capacitance value of the charge storage capacitor 26 is represented by CGC, the quantity of charge stored in the charge storage capacitor 26 by QGC, and the potential of the charge storage capacitor 26 by VGC, the relation among CGC, QGC, and VGC is $QGC = CGC \times VGC.$ If the threshold voltage of the amplifying transistor is represented by Vtha, then $VGC = VFD - Vtha.$ As a result, the quantity of charge stored in the charge storage capacitor 26 QGC is given by $QGC = CGC\{(QFD/CFD) - Vtha\}.$ This expression shows that the quantity of charge stored in the charge storage capacitor 26 QGC is given by the first term that is linearly proportional to the quantity of charge QFD stored in the FD section 28 (with a constant of proportion CGC/CFD) minus the second term CGC·Vtha.

As described above, the quantity of charge QGC stored in the charge storage capacitor 26 is given by amplifying the quantity of charge QFD stored in the FD section with the use of the transistor 24 that has the gain CGC/CFD. By setting the gain CGC/CFD of the transistor 24 large, the fluctuation of the voltage VGC of the charge storage capacitor 26 owing to external factors can be reduced. The terms "external factors" here are thermal fluctuations, leak currents, and the like.

It is also desirable that the capacitance value CGC of the charge storage capacitor 26 is larger than that of the wiring capacity of the vertical signal line 17. The reason is that, if the capacitance value CGC of the charge storage capacitor 26 is smaller than that of the wiring capacity of the vertical signal line 17, there is concern that the signal read out from the charge storage capacitor 26 to the vertical signal line 17 is buried by noises existing on the vertical signal line 17.

In other words, the S/N ratio on the vertical signal line 17 can be improved by setting the capacitance value CGC of the charge storage capacitor 26 larger than that of the wiring capacity of the vertical signal line 17. From the view point of the configuration of the pixel array section, if it is difficult to set the capacitance value CGC of the charge storage capacitor 26 larger than that of the wiring capacity of the vertical signal line 17, it is necessary to adopt one of the methods to effectively reduce the capacitance value of the wiring capacity of the vertical signal line 17.

Figure 6:
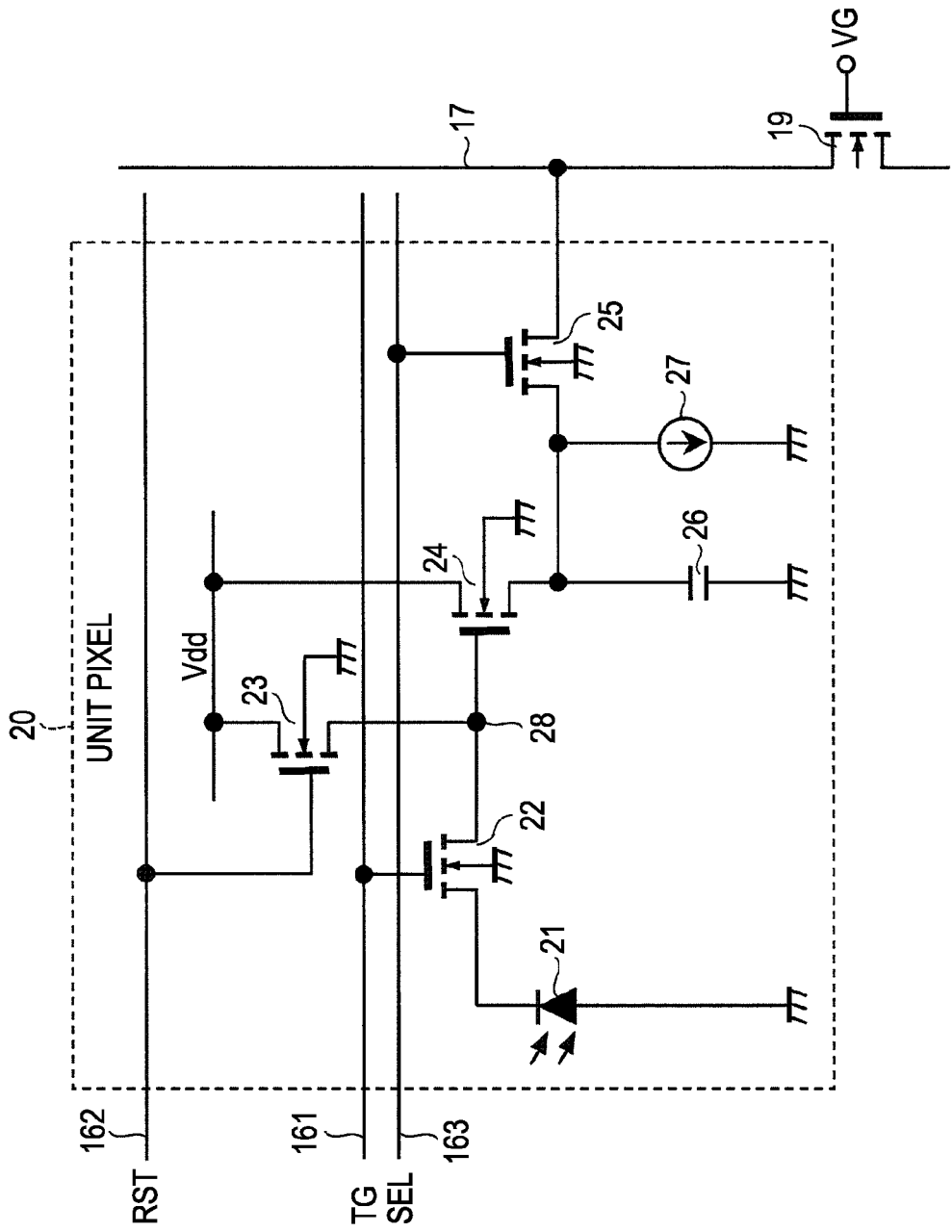
FIG. 6 is a circuit diagram showing an example of a method for reducing the capacitance value of a wiring capacity of a vertical signal line.

To put it concretely, an example of the methods is realized in such a way that a MOS transistor 19 for effectively reducing the capacitance value of the wiring capacity of the vertical signal line 17 is installed per pixel column, and the bias voltage VG is constantly applied to the gate electrode of the MOS transistor 19 as shown in FIG. 6. By the above-described method, the capacitance value of the wiring capacity of the vertical signal line 17 can be effectively reduced lower than the capacitance value CGC of the charge storage capacitor 26. In this way, if the capacitance value of the wiring capacity of the vertical signal line 17 is larger than the capacitance value CGC of the charge storage capacitor 26, it is possible to make the capacitance value CGC of the charge storage capacitor 26 larger than the capacitance value of the wiring capacity of the vertical signal line 17 by effectively reducing the capacitance value of the wiring capacity.

[Advantages of the First Embodiment]

As described above, in an X-Y address type solid-state imaging device such as the CMOS image sensor 10, a global shutter function that gives exposure to all the pixels 20 at the same timing can be realized by adding the charge storage capacitor 26 that temporarily stores electric charge to each pixel 20. In an example of the behavior of the global shutter function shown in FIG. 4, this function has been performed on all the pixels until the time t15.

The configuration, where the charge storage capacitor 26 is provided between the amplifying transistor 24 and the selection transistor 25 in order to realize a global shutter function, brings about following advantages. Because the charge storage capacitor 26 is not connected in parallel with the FD section 28, the capacitance value of the charge storage capacitor 26 does not affect the capacitance value of the FD section 28.

Therefore, the charge retention time of the charge storage capacitor 26 and the charge-voltage conversion efficiency of the FD section 28 that may have a trade-off relation with each other can be both satisfied. To put it concretely, the charge retention time of the charge storage capacitor 26 can be increased and the resistance to noise can be improved without decreasing the charge-voltage conversion efficiency of the FD section 28 by setting the capacitance value of the charge storage capacitor 26 large.

In addition, in the case of the minimum number of elements to be added, adding only one charge storage capacitor 26 to each pixel 20 can realize a global shutter function. Therefore, a solid-state imaging device integrated in the high density without decreasing the charge-voltage conversion efficiency of the FD section 28 can be provided. In addition, in the configuration to provide one current source 27 for one pixel row or for one pixel array section as a common component, it is not necessary to add signals to drive the pixels 20, so that there is not necessary to change the circuit configuration of the vertical driving section 12.

3. A Second Embodiment of the Present Invention

In the first embodiment of the present invention, each pixel 20 includes its own charge storage capacitor 26 and the like. On the other hand, in the second embodiment of the present invention, some of the components of the pixel 20 are shared by plural pixels, and at least a charge storage capacitor 26 is shared by plural pixels. In this embodiment, the case where some of the components are shared between two adjacent pixels belonging to the same pixel column will be taken as an example.

[Circuit Configuration]

Figure 7:
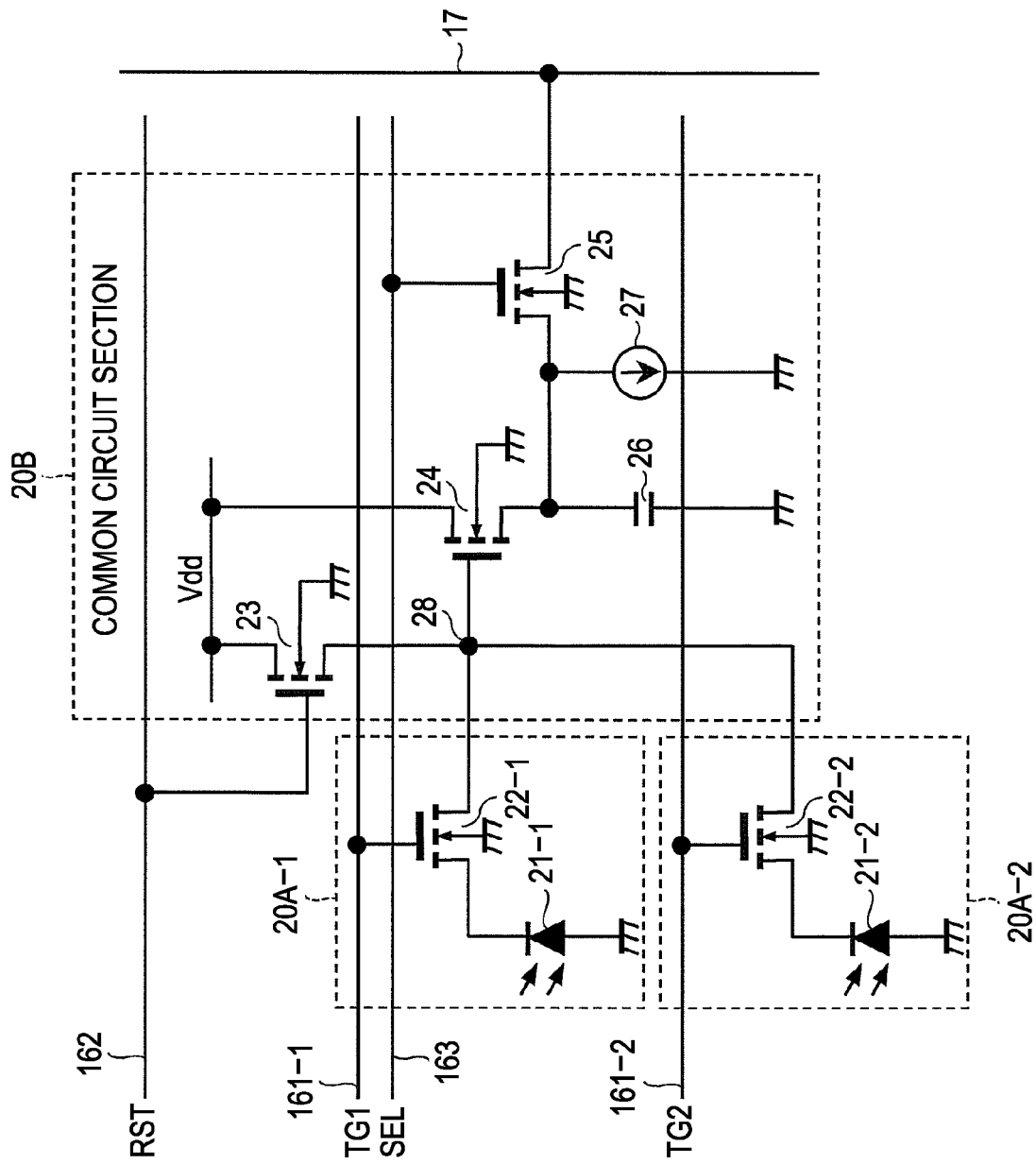
FIG. 7 is a circuit diagram showing a circuit configuration of pixels with common components according to a second embodiment of the present invention.

FIG. 7 is a circuit diagram showing a circuit configuration of pixels 20 with common components according to the second embodiment of the present invention. Components shown in FIG. 7 that are the same as those shown in FIG. 2 have the same reference symbols as those shown in FIG. 2.

In FIG. 7, it will be assumed that components shared by two pixels 20A-1 and 20A-2 are a reset transistor 23, a amplifying transistor 24, a selection transistor 25, a charge storage capacitor 26, a current source 27, and a FD section 28. In other words, the reset transistor 23, the amplifying transistor 24, the selection transistor 25, the charge storage capacitor 26, the current source 27, and the FD section 28 are the components of a common circuit section 20B shared between two pixels 20A-1 and 20A-2.

In this embodiment, although the current source 27 is shared between two pixels 20A-1 and 20A-2, the current source 27 can be shared by all common circuit sections 20B of all the pixels belonging to the same pixel column or by all common circuit sections 20B belonging to the pixel array section in a similar way to the first embodiment.

In addition, the reset transistor 23, the amplifying transistor 24, the selection transistor 25, the charge storage capacitor 26, the current source 27, and the FD section 28 are shared as common components between the adjacent pixels 20A-1 and 20A-2, but not all but some of these common components can be shared by the adjacent pixels 20A-1 and 20A-2. In addition, these common components can be shared not only by two pixels, but also can be shared by more than two pixels.

The pixel 20A-1 includes a photodiode 21-1 and a transfer transistor 22-1. The anode electrode of the photodiode 21-1 is connected to ground, and the cathode electrode of the photodiode 21-1 is connected to one of the main electrodes of the transfer transistor 22-1. The other of the main electrodes of the transfer transistor 22-1 is connected to the FD section 28. The gate electrode of the transfer transistor 22-1 is given a High active transfer signal TG1 through a transfer line 161-1.

The pixel 20A-2 includes a photodiode 21-2 and a transfer transistor 22-2. The anode electrode of the photodiode 21-2 is connected to ground, and the cathode electrode of the photodiode 21-2 is connected to one of the main electrodes of the transfer transistor 22-2. The other of the main electrodes of the transfer transistor 22-2 is connected to the FD section 28. The gate electrode of the transfer transistor 22-2 is given a High active transfer signal TG2 through a transfer line 161-2.

The common circuit 20B according to this embodiment includes the reset transistor 23, the amplifying transistor 24, the selection transistor 25, the charge storage capacitor 26, the current source 27, and the FD section 28.

The drain electrode of the reset transistor 23 is connected to a positive power supply voltage Vdd, and the source electrode of the reset transistor 23 is connected to the FD section 28. The reset Transistor 23 turns on when its gate electrode is given a High active reset signal FRST through a reset line 162, which causes the electric charge stored in the FD section 28 to be absorbed into the positive power supply voltage Vdd, so that the FD section 28 is reset.

The gate electrode of the amplifying transistor 24 is connected to the FD section 28, and the drain electrode of the amplifying transistor 24 is connected to the positive power supply voltage Vdd. For example, the drain electrode of the selection transistor 25 is connected to one of the terminals of the charge storage capacitor 26, which is also connected to the source electrode of the amplifying transistor 24, and the source electrode of the selection transistor 25 is connected to a vertical signal line 17.

When a High active selection signal SEL is applied to the gate electrode of the selection transistor 25 through a selection line 163, the selection transistor 25 turns on, which in turn causes the amplifying transistor 24 to be on. In other words, the selection transistor 25 causes the pixel 20 to be selected, and relays a signal output from the amplifying transistor 24 to the vertical signal line 17.

The charge storage capacitor (GC) 26 is provided to realize a global shutter function, and is disposed between the source electrode of the amplifying transistor 24 and ground. It is necessary that the charge storage capacitor 26 has a capacitance value larger than that of the wiring capacity (parasitic capacity etc.) of the vertical signal line 17. The charge storage capacity 26 will be described in detail later.

The current source (IGC) 27 is disposed between the source electrode of the amplifying transistor 24 and ground in the same manner as the charge storage capacitor 26. In other words, the current source 27 is connected to the charge storage capacitor 26 in parallel. As this current source, the current source with the same configuration as that of the current source of the first embodiment can be used.

[Circuit Behavior]

In the configuration of the pixel that shares the common circuit section according to the second embodiment, almost all the components except the photodiode 21 and the transfer transistor 22 are shared, for example, by the pixels 20A-1 and 20A-2. Therefore, the circuit behavior of the pixel is fundamentally the same as that of the pixel according to the first embodiment except the operations for transferring charge from the photodiodes 21-1 and 21-2 on the basis of the transfer signals TG1 and TG2 respectively.

[Advantages of the Second Embodiment]

Even in the circuit configuration where some of the components of the pixel 20 are shared by plural pixels, if a charge storage capacitor 26 is provided for each pixel, the global shutter function can be realized. In a similar way to the first embodiment, the configuration, where the charge storage capacitor 26 is provided between the amplifying transistor 24 and the selection transistor 25 in order to realize a global shutter function, enables the charge retention time of the charge storage capacitor 26 and the charge-voltage conversion efficiency of the FD section 28 that may have a trade-off relation with each other to be both satisfied.

In addition, the circuit configuration according to the second embodiment, where almost all the components of the pixel 20 are shared by plural pixels, can realize the global shutter function with very small number of components per pixel, which results in a solid-state imaging device integrated in the higher density compared with the solid-state imaging device according to the first embodiment.

4. Charge Storage Capacitor

Next, the charge storage capacitor 26 used in the pixel circuit of the above-described embodiments will be described in detail.

For the charge storage capacitor 26 provided per pixel 20, there is no restriction on its type in principle, but a stacked capacitor, a trench capacitor, or a junction capacitor is desirable from the viewpoint of high-density integration of the device. Particularly the stacked capacitor has an advantage in that it can secure a large capacitance value per unit area.

In addition, because the CMOS image sensor 10 according to the embodiments of the present invention has back-illuminated type pixel structure, it can secure a larger area for forming the charge storage capacitor 26 than a CMOS image sensor with front-thinned type pixel structure. If a larger area for forming the charge storage capacitor 26 can be secured, the capacitance value of the charge storage capacitor 26 can be set larger, with the result that the charge retention time of the charge storage capacitor 26 can be increased and the resistance to noise of the charge storage capacitor 26 can be improved. The back-illuminated type pixel structure is a pixel structure where, assuming the front surface of the pixel is located at the interconnection layer side, incident light enters into the back surface that is located at the opposite side of the interconnection layer.

[A Back-Illuminated Type Pixel Structure]

Figure 8:
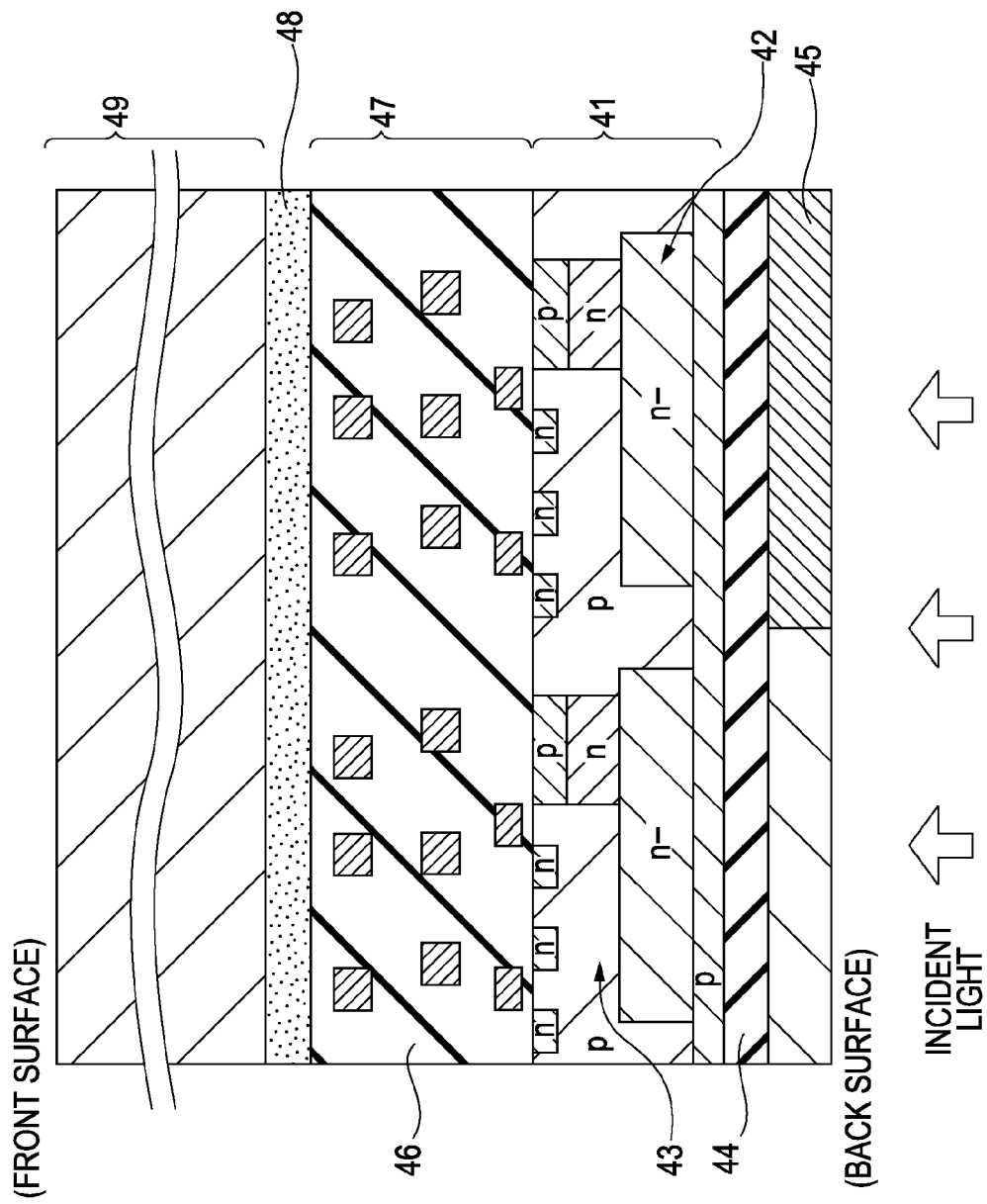
FIG. 8 is a cross-sectional diagram showing an example of a pixel structure of a back-illuminated type.

FIG. 8 is a cross-sectional diagram showing an example of a pixel structure of a back-illuminated type;

FIG. 8 shows that photodiodes 42 and pixel transistors 43 are formed in a silicon section (silicon substrate) 41. In other words, the silicon section 41 is a section for forming semiconductor elements. Here, the photodiodes 42 shown in FIG. 8 are used as the photodiode 21 in FIG. 2, and the photodiodes 21-1 and 21-2 in FIG. 7. The pixel transistors 43 are used as the transfer transistors 22, 22-1 and 22-2, the reset transistors 23, the amplifying transistors 24, and the selection transistors 25 shown in FIG. 2 and in FIG. 7.

At one side of the silicon section 41, a color filter 45 is formed with a interlayer film between the color filter 45 and the silicon section 41. Therefore, incident light that enters into this side of the silicon section 41 reaches the light acceptance surface of the photodiode 42 through the color filter 45. On the other side of the silicon section 41, there is an interlayer insulating film 46 in which the interconnection layer 47, which includes the gate electrodes of the pixel transistors 43 and metal wires in a multilayer structure, is formed. As for the surface of the interconnection layer 47 opposite to the silicon section 41, a support substrate 49 is pasted on this surface with the use of an adhesive agent 48.

In the above pixel structure, let's call the side of the silicon section 41, where the photodiodes 42 and the pixel transistors 43 are formed, adjacent to the interconnection layer 47 a front side, and the side of the silicon section 41 opposite to the interconnection layer 47 a back side. Therefore, the pixel structure according to the embodiments of the present invention is a back-illuminated pixel structure where incident light can be brought in from the back side of the silicon section 41.

Owing to this back-illuminated pixel structure, incident light can be brought in from the back, and the aperture ratio can be set 100%. In addition, the interconnection layer 47 is not located at the side of the aperture, incident light can reach the light acceptance surface of the photodiode 47 without using an on-chip lens.

[Stacked Capacitor]

An example of the structure of the charge storage capacitor 26 that is adopted to the back-illuminated pixel structure and formed with the use of stacked capacitors will be described below.

Figure 9:
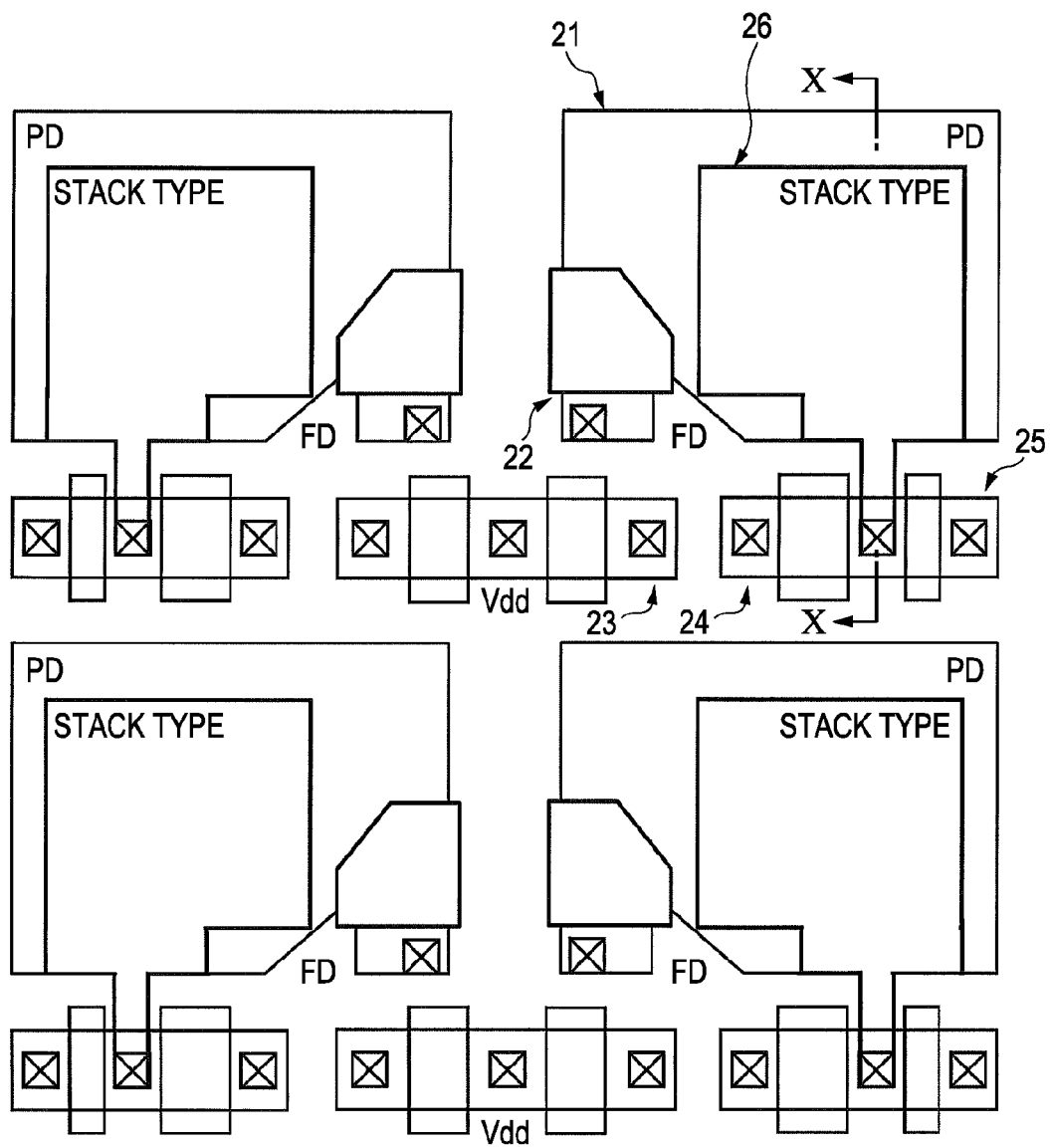
FIG. 9 is a schematic plan view showing a pixel layout with four pixels in which each of the four pixels includes a stacked capacitor used as a charge storage capacitor.

FIG. 9 is a schematic plan view showing a pixel layout in which stacked capacitors are used as the charge storage capacitors, where components shown in FIG. 9 that are the same as those shown in FIG. 2 have the same reference symbols as those shown in FIG. 2. FIG. 9 shows the pixel layout including four pixels that are adjacent to each other in a 2-by-2 array. In addition, FIG. 10 is a cross-sectional diagram showing the cross-sectional structure of one of the four pixels taken along the line X-X of FIG. 9.

As is clear from FIG. 9, because the back-illuminated pixel structure gives almost no constraint on incident light, the charge storage capacitor 26 composed of stacked capacitors can be disposed on an interlayer insulating film 54 so that the charge storage capacitor 26 covers a wide range of the photodiode (PD) 21. Because the charge storage capacitor 26 can be disposed over the photodiode 21 in this way, the filling rate of the photodiode (PD) per pixel can be increased. In addition, employing the stacked capacitor as the charge storage capacitor 26 enables the capacitance value of the charge storage capacitor 26 to be set large.

Figure 10:
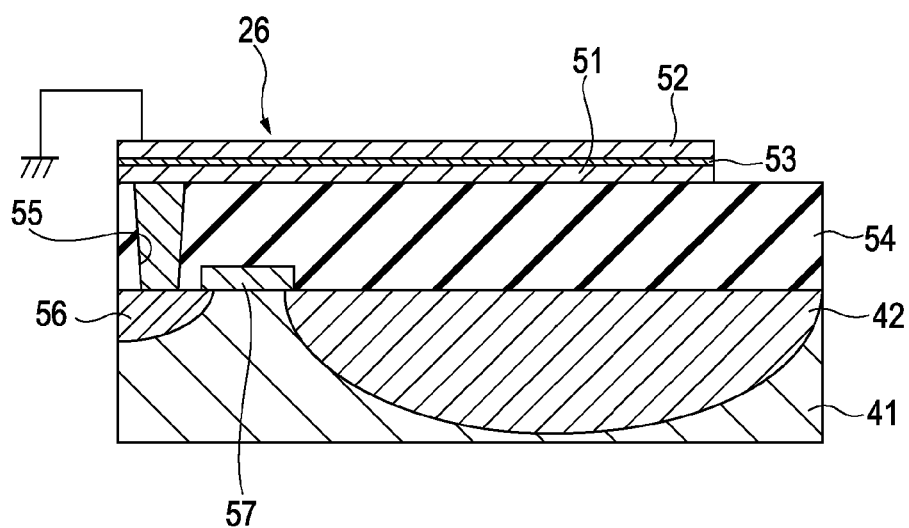
FIG. 10 is a cross-sectional diagram showing the cross-sectional structure of one of the four pixels taken along the line X-X of FIG. 9.

Components shown in FIG. 10 that are the same as those shown in FIG. 8 have the same reference symbols as those shown in FIG. 8. As shown in FIG. 10, the charge storage capacitor 26, which is a stacked capacitor, is realized by a structure in which a dielectric material 53 is sandwiched in between a lower electrode 51 and an upper electrode 52.

It is desirable that a material for the lower electrode 51 or the upper electrode 52 is a material that has a high melting point and a small diffusion coefficient in silicon such as tungsten, tantalum nitride, and the like. It is also desirable that a material for the dielectric material 53 is a material that has a high dielectric constant and excellent leakage current characteristics such as silicon dioxide, silicon nitride, hafnium dioxide, zirconium dioxide, tantalum pentoxide, and the like.

The lower electrode 51 is electrically-connected to a diffusion layer 56 that forms the source area of the amplifying transistor 24 shown in FIG. 2 and FIG. 7 through a contact via 55 formed in the interlayer insulating film 54 (that corresponds to the interlayer insulating film 46 in FIG. 8). The upper electrode 52 is connected to ground. The element separating area 57 is formed between the diffusion layer 56 and the photodiode 42 (corresponding to the photodiode 21 in FIG. 2 and the photodiodes 21-1 and 21-2 in FIG. 7).

5. Modifications

Although the description has been made under the assumption that the noise elimination process and the A/D conversion process are executed in the column processing section 13 in the above-described embodiments, these processes can be made in the stage subsequent to the column processing section 13 or outside the semiconductor substrate(chip) 18.

In addition, although the above embodiments have been described as explanatory examples applied to the CMOS image sensor, the present invention is not limited in its application to the CMOS image sensor. In other words, it is to be understood that the present invention can be applied to general X-Y address type solid-state imaging devices where pixels, which output electric signals after detecting the quantities of electric charge based on the quantities of visible incident light, are disposed in a matrix.

In addition, the solid-state imaging device can be formed as a one-chip device, or can be formed as a modular imaging device in which a imaging section, a signal processing section, and an optical system are packaged as an all-in-one device.

6. An Electronic Apparatus According to an Embodiment of the Present Invention The present invention can be applied not only to solid-state imaging devices, but also to electronic apparatuses including an imaging apparatus and the like. Here, the electronic apparatuses are used to refer to imaging apparatuses (camera systems) such as a digital still camera and a video camera, mobile devices with a imaging function such as a cellular phone and a PDA (personal digital assistance), and the like. In addition, there is a case where the above-mentioned modular imaging device, that is, a camera module, which is mounted on an electronic apparatus, is called an imaging apparatus.

[Imaging Apparatus]

FIG. 11 is a block diagram showing an example of a schematic configuration of an imaging apparatus as an example of electronic apparatuses according to an embodiment of the present invention. As shown in FIG. 11, the imaging apparatus 100 according to the embodiment of the present invention includes an optical system including a lens group 101, an imaging element 102, a DSP circuit 103 that is a camera signal processing section, a frame memory 104, a display unit 105, a recording unit 106, an operation system 107, a power supply system 108, and the like. The DSP circuit 103, the frame memory 104, the display unit 105, the recording unit 106, the operation system 107, and the power supply system 108 are interconnected through a bus line 109.

The lens group 101 brings in incident light from an object, and builds up an image of the object on the imaging area of the imaging element 102. The imaging element 102 converts the quantity of incident light based on the image built up on the imaging area by the lens group 101 into electrical signals on a pixel-by-pixel basis, and the electrical signals are output as pixel signals. The CMOS image sensor according to the first or second embodiment that can realize the global shutter function without decreasing the charge-voltage conversion efficiency of the FD section is used as this imaging element 102.

The display unit 105 is a panel display such as a liquid crystal display or an electro luminescence display, and it displays moving images or still images captured by the imaging element 102. The recording unit 106 records moving images or still images captured by the imaging element 102 on a recording medium such as a video tape or a DVD (digital versatile disk).

The operation system 107 issues operation instructions regarding various functions possessed by this imaging apparatus in accordance with operations by a user. The power supply system 108 supplies various power sources necessary for the DSP circuit 103, the frame memory 104, the display unit 105, the recording unit 106, and the operation system 107.

The above-described imaging apparatus 100 can be applied to video cameras, digital still cameras, or camera modules used for mobile devices such as cellular phones. Because the global shutter function can be realized without decreasing the charge-voltage conversion efficiency of the FD section by adopting the CMOS image sensor according to the first or second embodiment as the imaging element 102, distortion-free captured images of high quality can be captured by the imaging apparatus.

The present application contains subject matter related to that disclosed in Japanese Priority Patent Application JP 2009-065391 filed in the Japan Patent Office on Mar. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising a plurality of pixels, each pixel including:
   a transfer transistor operable to transfer electric charge from a photoelectric conversion section to a floating diffusion section, a reset transistor operable to reset the floating diffusion section, an amplifying transistor operable to output a signal based on the electric charge held by the floating diffusion section, a selection transistor that is disposed at the output side of the amplifying transistor and operable to select a pixel, a signal line operable to output a signal through the selection transistor, and a charge storage capacitor that (i) is electrically connected between the amplifying transistor and the selection transistor and (ii) operatively interconnected to store a quantity of electric charge transferred from the floating diffusion section determined by the quantity of the electric charge held by the floating diffusion section in accordance with the charge-discharge behavior of electric charge supplied from a current source, the charge storage capacitor having a capacitance value larger than a parasitic capacitance value of the signal line.

2. The solid-state imaging device according to claim 1, wherein the charge storage capacitor is disposed between the source electrode of the amplifying transistor and a reference potential node.

3. The solid-state imaging device according to claim 1, further comprising a unit operable to reduce the capacitance value of the wiring capacitance of the signal line.

4. The solid-state imaging device according to claim 1, wherein, after the floating diffusion section is reset by the reset transistor, the charge storage capacitor continues to hold the quantity of the charge held by the floating diffusion section at the time of the reset of the floating diffusion section until the voltage between the terminals of the charge storage capacitor based on the quantity of the charge is read out.

5. The solid-state imaging device according to claim 1, wherein the current source becomes active after the floating diffusion section is reset by the reset transistor.

6. The solid-state imaging device according to claim 5, wherein the current source is installed as an element shared by all the pixels of each pixel row or as an element shared by all the pixels of a pixel array section.

7. The solid-state imaging device according to claim 1, wherein the solid-state imaging device includes groups of a plurality of the pixels and at the same time includes at least one charge storage capacitor shared by the plurality of the pixels belonging to each group.

8. The solid-state imaging device according to claim 1, wherein:
the pixel has a back-illuminated type structure in which incident light enters the back surface located opposite an interconnection layer of the photoelectric conversion section; and
the charge storage capacitor is formed at the side of the interconnection layer of each pixel.

9. The solid-state imaging device according to claim 8, wherein the charge storage capacitor is a stacked capacitor.

10. A method for driving a solid-state imaging device including a plurality of pixels, each pixel being equipped with (i) an amplifying transistor operable to output a signal based on electric charge transferred by a photoelectric conversion section and held by a floating diffusion section, and (ii) a charge storage capacitor electrically connected between the amplifying transistor and a selection transistor, the charge storage capacitor having a capacitance value larger than a parasitic capacitance value of a signal line, the selection transistor disposed at the output side of the amplifying transistor and operable to select a pixel, the signal line operable to output a signal through the selection transistor, the method comprising the successive steps of:

resetting the floating diffusion section;

transferring electric charge from the photoelectric conversion section to the floating diffusion section under the condition that the charge storage capacitor continues to hold a first quantity of charge transferred from the floating diffusion section determined by the quantity of the charge held by the floating diffusion section at the time of the resetting of the floating diffusion section;

deriving a first voltage between the terminals of the charge storage capacitor based on the first quantity of charge held by the charge storage capacitor through the selection transistor as a reset voltage;

causing the charge storage capacitor to store a second quantity of charge on the basis of the quantity of the charge transferred from the photoelectric conversion section to the floating diffusion section; and deriving a second voltage between the terminals of the charge storage capacitor as a signal voltage.

11. An electronic apparatus including a solid-state imaging device including a plurality of pixels, each pixel comprising:
a transfer transistor operable to transfer electric charge from a photoelectric conversion section to a floating diffusion section;
a reset transistor operable to reset the floating diffusion section;
an amplifying transistor operable to output a signal based on the electric charge held by the floating diffusion section;
a selection transistor that is (i) disposed at the output side of the amplifying transistor and (ii) operable to select a pixel;
a signal line operable to output a signal through the selection transistor; and
a charge storage capacitor that (i) is electrically connected between the amplifying transistor and the selection transistor and (ii) operatively interconnected to store a quantity of electric charge transferred from the floating diffusion section determined by the quantity of the electric charge held by the floating diffusion section in accordance with the charge-discharge behavior of electric charge supplied from a current source, the charge storage capacitor having a capacitance value larger than a parasitic capacitance value of the signal line.

12. The electronic apparatus according to claim 11, wherein the charge storage capacitor is disposed between the source electrode of the amplifying transistor and a reference potential node.

13. The electronic apparatus according to claim 11, further comprising a unit operable to reduce the capacitance value of the wiring capacitance of the signal line.

14. The electronic apparatus according to claim 11, wherein, after the floating diffusion section is reset by the reset transistor, the charge storage capacitor continues to hold the quantity of the charge held by the floating diffusion section at the time of the reset of the floating diffusion section until the voltage between the terminals of the charge storage capacitor based on the quantity of the charge is read out.

15. The electronic apparatus according to claim 11, wherein the current source becomes active after the floating diffusion section is reset by the reset transistor.

16. The electronic apparatus according to claim 15, wherein the current source is installed as an element shared by all the pixels of each pixel row or as an element shared by all the pixels of a pixel array section.

17. The electronic apparatus according to claim 11, wherein the solid-state imaging device includes groups of a plurality of the pixels and at the same time includes at least one charge storage capacitor shared by the plurality of the pixels belonging to each group.

18. The electronic apparatus according to claim 11, wherein:
   the pixel has a back-illuminated type structure in which incident light enters the back surface located opposite an interconnection layer of the photoelectric conversion section; and
   the charge storage capacitor is formed at the side of the interconnection layer of each pixel.

19. The electronic apparatus according to claim 18, wherein the charge storage capacitor is a stacked capacitor.

* * * * *